United States Patent [19]

Lee

[11] Patent Number: 5,587,818
[45] Date of Patent: Dec. 24, 1996

[54] THREE COLOR LCD WITH A BLACK MATRIX AND RED AND/OR BLUE FILTERS ON ONE SUBSTRATE AND WITH GREEN FILTERS AND RED AND/OR BLUE FILTERS ON THE OPPOSITE SUBSTRATE

[75] Inventor: Si-Hyun Lee, Suwon, Rep. of Korea

[73] Assignee: Samsung Display Devices Co., Ltd., Kyungki-do, Rep. of Korea

[21] Appl. No.: 569,697

[22] Filed: Dec. 8, 1995

[30] Foreign Application Priority Data

Dec. 26, 1994 [KR] Rep. of Korea ................. 94-36911

[51] Int. Cl.$^6$ .................. G02F 1/1335; G02F 1/1333
[52] U.S. Cl. ............................. 349/106; 349/110
[58] Field of Search ........................... 359/68, 67

[56] References Cited

U.S. PATENT DOCUMENTS 5,442,467 8/1995 Silverstein et al. .................... 359/68

Primary Examiner—Anita Pellman Gross
Assistant Examiner—Walter J. Malinowski
Attorney, Agent, or Firm—Lowe, Price, LeBlanc & Becker

[57] ABSTRACT

A liquid crystal display (LCD) whose red, green and blue filters are formed on different substrates is disclosed. The LCD thus controls the width of the black matrix, enlarges the width of the filters and easily forms a color filter, having lower colorimetric purity and transmissivity than the other color filters. In an embodiment, both the blue filter and the black matrix are formed on the top glass substrate, while the red and green filters are formed on the bottom glass substrate opposite from the top substrate such that the red and green filters of the bottom substrate are aligned with the blue filter of the top substrate.

2 Claims, 4 Drawing Sheets

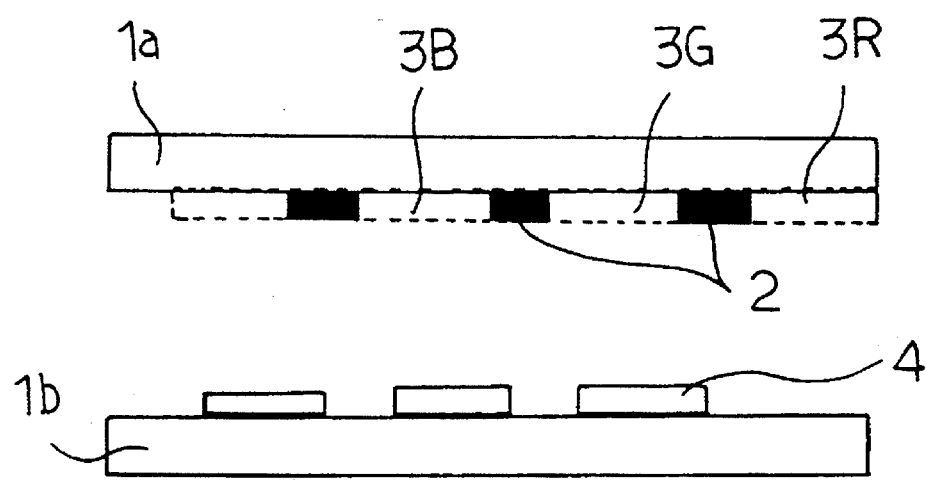

THREE COLOR LCD WITH A BLACK MATRIX AND RED AND/OR BLUE FILTERS ON ONE SUBSTRATE AND WITH GREEN FILTERS AND RED AND/OR BLUE FILTERS ON THE OPPOSITE SUBSTRATE

BACKGROUND OF THE INVENTION

1. Field of the Invention

The present invention relates in general to liquid crystal displays and, more particularly, to a structural improvement in such liquid crystal displays (LCD) for easily controlling both the width of a black matrix and the size of R (red), G (green) and B (blue) filters by forming the black matrix and the R, G and B filters on different substrates. Forming of the R, G and B filters and the black matrix on different substrates also allows a color filter, having relatively lower colorimetric purity and transmissivity, to be formed separately from the other color filters thereby improving the displaying efficiency of the LCD.

2. Description of the Prior Art

FIG. 1 shows a typical liquid crystal display. As shown in the drawing, the typical liquid crystal display (LCD) includes a top glass substrate 1a. Three color filters, that is, R (red), G (green) and B (blue) filters 3R, 3G and 3B, are formed on the bottom surface of the top substrate 1a. Formed between the color filters on the top substrate 1a is a black matrix 2. The above LCD also includes a bottom glass substrate 1b opposite from the top substrate 1a. A plurality of ITO (indium tin oxide) drive electrodes 4 are formed on the top surface of the bottom substrate 1b. The above ITO electrodes 4 are aligned with the R, G and B filters of the top substrate 1a, respectively. After preparing the above top and bottom substrates 1a and 1b, liquid crystal is injected between the two substrates 1a and 1b prior to enveloping the two substrates 1a and 1b. When the ITO electrodes 4 of the above LCD are applied with a voltage, the LCD displays a color picture in accordance with intrinsic characteristics of the liquid crystal interposed between the two substrates 1a and 1b.

FIGS. 2A to 2F show a process for producing the above LCD. As shown in FIG. 2A, a light intercepting chrome layer is deposited on the top glass substrate 1a through either an electron beam deposition or a vacuum deposition. An example of vacuum deposition for forming the chrome layer is sputtering. Deposition of the light intercepting chrome layer is followed by forming of the black matrix 2. The above matrix 2 is formed through application of a photoresist, exposure with a mask, developing, wet etching, etc. Thereafter, a green filter patterning photoresist resin 3 is applied on the black matrix 2 prior to exposing with a mask. The top substrate 1a in turn is dyed with a dye having a given spectrum characteristic thereby forming the green filter 3G as shown in FIG. 2B. Thereafter, a red filter patterning photoresist resin 3 is applied on the resulting substrate 1a of FIG. 2B as shown in FIG. 2C. The substrate 1a in turn is exposed with a mask and dyed with a dye having a given spectrum characteristic thereby forming the red filter 3R as shown in FIG. 2D. A blue filter patterning photoresist resin 3 is applied on the resulting substrate 1a of FIG. 2D as shown in FIG. 2E. The substrate 1a in turn is exposed with a mask and dyed with a dye having a given spectrum characteristic thereby forming the blue filter 3B as shown in FIG. 2F. That is, the R, G and B filters are formed on the top substrate 1a in order of the G filter 3G, R filter 3R and B filter 3B.

In the above process for forming the R, G and B filters on the substrate 1a, the green filter 3G has less bonding force for being bonded to the other colors in comparison with the other filters. Therefore, the green filter has to be primarily formed on the substrate 1a by exposing the substrate 1a with a mask after applying the green filter patterning photoresist resin on the substrate 1a. Thereafter, the red and blue filters are formed on the green filter in the same manner as described for the green filter. In the above process, it is required to carefully check both the exposing light intensity and the development due to a narrow developing margin.

However, as both the R, G and B filters and the black matrix are formed on the same plane, it is very difficult to technically reduce the area of the black matrix on a screen in view of aperture efficiency. Additionally, the G filter has an inferior bonding force for being bonded to the glass substrate because the G filter intrinsically has lower colorimetric purity and transmissivity than the other filters. In this regard, the G filter has to be formed on the glass substrate while either changing the step for forming the G filter with the other steps for forming the other filters or using a specified method.

SUMMARY OF THE INVENTION

It is, therefore, an object of the present invention to provide a liquid crystal display in which the above problems can be overcome and which forms the R, G and B filters on different substrates thereby controlling the width of the black matrix, enlarging the width of each filter and easily forming a filter intrinsically having lower colorimetric purity and transmissivity than the other filters.

In order to accomplish the above object, the present invention provides a liquid crystal display comprising a black matrix and a plurality of color (red, green and blue) filters formed on a pair of opposite glass substrates, wherein one or two color filters, except for the green filter, are formed on one glass substrate with the black matrix, while one or two color filters, including the green filter, are formed on the other glass substrate such that the color filter of the one glass substrate is aligned with the color filter of the other glass substrate.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a sectional view showing the construction of a liquid crystal display (LCD);

DESCRIPTION OF THE PREFERRED EMBODIMENTS

Figure 2A:
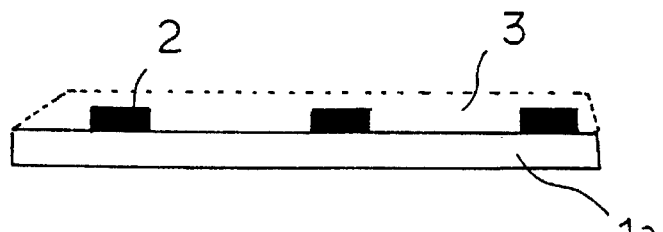
FIGS. 2A to 2F are views showing a process for producing the LCD of FIG. 1.
Figure 2B:
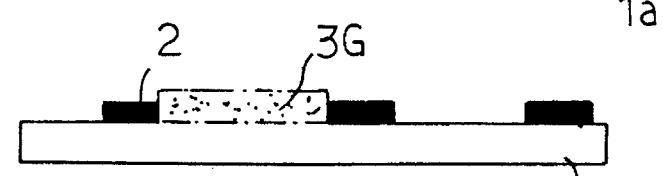
Figure 2C:
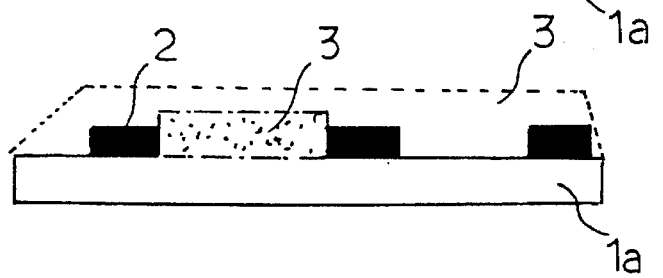
Figure 2D:
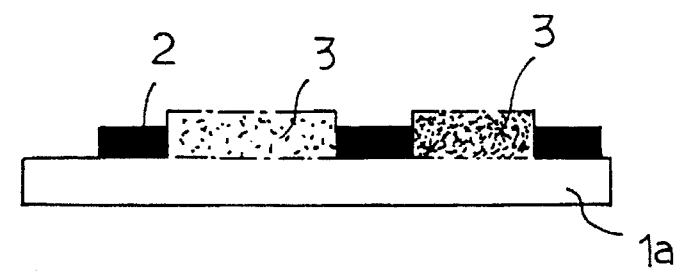
Figure 2E:
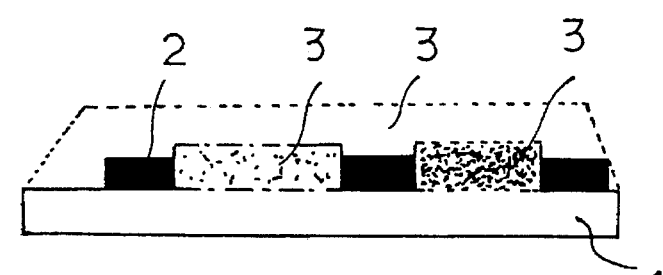
Figure 2F:
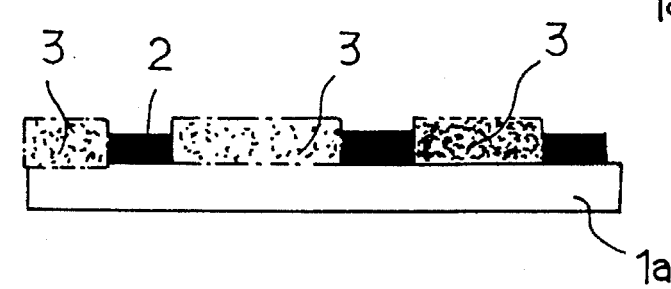
Figure 3:
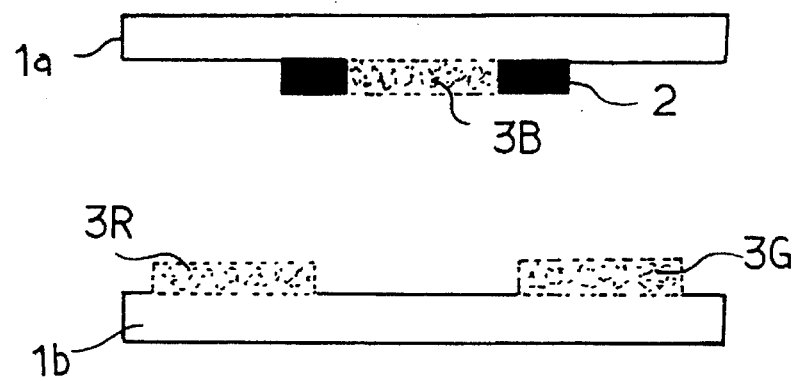
FIG. 3 is a sectional view showing the construction of an LCD in accordance with a preferred embodiment of this invention.

FIG. 3 is a sectional view showing the construction of an LCD in accordance with a preferred embodiment of this invention. As shown in this drawing, the LCD of this invention includes a black matrix 2 which is formed on the bottom surface of a top glass substrate 1a. One or two color filters (red and blue filters 3R and 3B), except for a green filter 3G, are formed on the bottom surface of the top substrate 1a. One or two color filters, including the green filter 3G, are formed on the top surface of a bottom glass substrate 1b opposite from the top substrate 1a. In this case, the filter, including the G filter, formed on the bottom substrate 1b is aligned with the filter formed on the top substrate 1a. In the preferred embodiment of FIG. 3, the B (blue) filter 3B, for example, is formed between the black matrix 2 of the top substrate 1a, while the R (red) and G (green) filters 3R and 3G are formed on the bottom substrate 1b.

Figure 4:
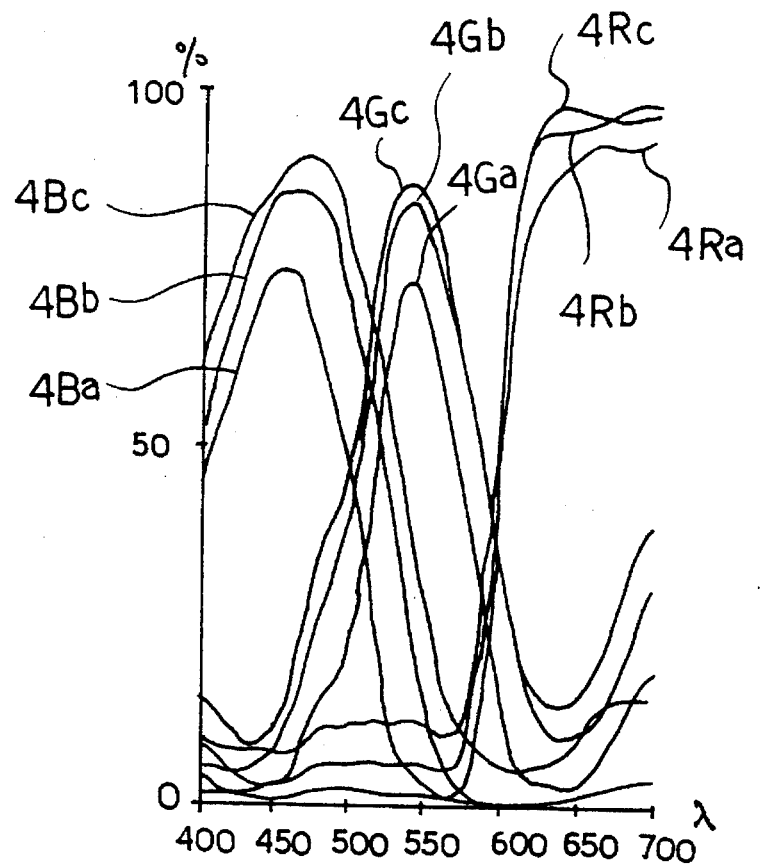
FIG. 4 is a graph showing transmissivity as a function of color filter's thickness of this LCD.

FIG. 4 is a graph showing the characteristic curves of transmissivity spectrums of beams passing through the R, G and B filters of the above LCD, the transmissivity spectrums varying in accordance with color filter's thickness (thickness a>thickness b>thickness c). In the back light, blue light of 400–500 nm wavelength ($\lambda$), green light of 520–560 nm and red light of not less than 600 nm wavelength are the light components which are practically required to produce the color image of this LCD. As shown in the curves 4Ba, 4Bb and 4Bc of the graph, the blue filter 3B more reliably filters off light having a wavelength other than the range of 400–500 nm when the thickness of the filter 3B is increased. As shown in the curves 4Ga, 4Gb and 4Gc of the graph, the green filter 3G more reliably filters off light having a wavelength other than the range of 500–560 nm when the thickness of the filter 3G is increased. The blue filter 3B more reliably filters off light having a wavelength of less than 600 nm when the thickness of the filter 3R is increased as shown in the curves 4Ra, 4Rb and 4Rc of the graph.

Figure 5:
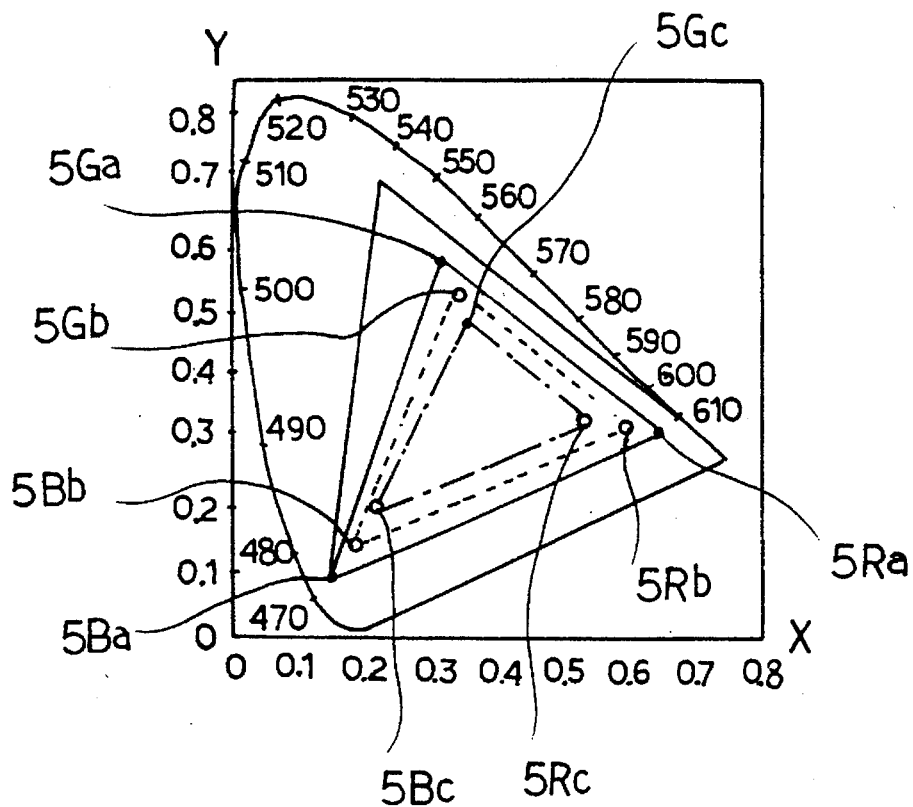
FIG. 5 is a graph showing colorimetric purity as a function of color filter's thickness of this LCD.

FIG. 5 is a graph showing colorimetric purity as a function of color filter's thickness (a>b>c) of this LCD. In the CIE chromaticity diagram of FIG. 5, the chromaticity points 5Ra, 5Rb and 5Rc are the chromaticity coordinates of light passing through the red filter (a>b>c). The chromaticity points 5Ga, 5Gb and 5Gc are the chromaticity coordinates of light passing through the green filter (a>b>c). The chromaticity points 5Ra, 5Rb and 5Rc are the chromaticity coordinates of light passing through the red filter (a>b>c). As shown in the graph of FIG. 5, the chromaticity coordinates of the light passing through the color filters 3R, 3G and 3B approximate to those of the CIE chromaticity diagram in proportion to the thickness of the color filters 3R, 3G and 3B. Therefore, the chromaticity purity of the LCD is improved in proportion to the color filter's thickness.

Figure 6:
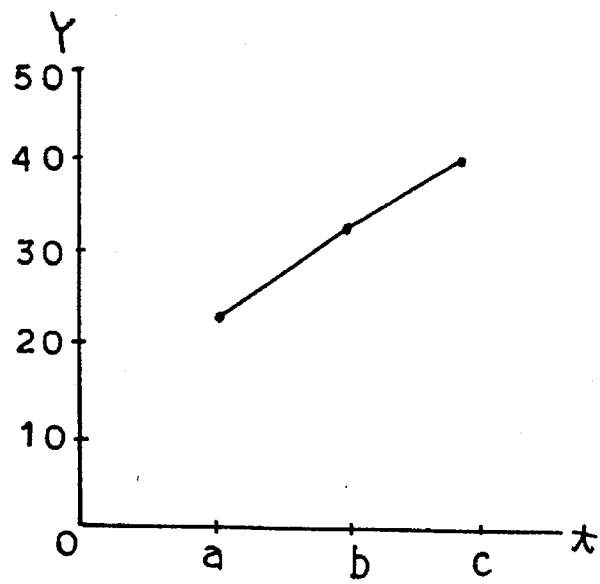
FIG. 6 is a graph showing brightness as a function of color filter's thickness of this LCD.

FIG. 6 is a graph showing brightness as a function of color filter's thickness (a>b>c) of the above LCD. As shown in this graph, the brightness (Y) is reduced in inverse proportion to the color filter's thickness.

The operational effect of the above LCD will be described herein, below.

In the above LCD, one or two color filters, except for the green filter 3G, are formed on the top substrate 1a with the black matrix 2, while one or two color filters, including the G filter 3G, are formed on the bottom glass substrate 1b. In this case, at least one filter, including the G filter, formed on the bottom substrate 1b is aligned with at least one filter formed on the top substrate 1a. That is, the green filter 3B and the black matrix 2 are formed on different substrates. In addition, the color filters 3R, 3G and 3B are formed on different substrates. It is thus possible to control the width of the black matrix 2. The R, G and B filters are less limited by area when forming the filters on the substrate thereby increasing the area ratio of the color filters in the LCD. Additionally, a gap is formed between the R, G and B filters 3R, 3G and 3B and the black matrix 2 since there is a cell gap of 6–7µ between the top and bottom glass substrates 1a and 1b. Therefore, the above LCD not only improves the aperture efficiency, but also enlarges the visible angle in accordance with diffraction of light. The green filter 3G having a lower bonding force than the other color filters 3R and 3B is formed on one glass substrate, while at least one of the other color filters is formed on the other glass substrate. That is, the green filter 3G and the other filters 3R and 3B are formed on different substrates. The color filters 3R, 3G and 3B of this LCD can be thus formed on the substrates in disregard of the conventional processing order of the green filter, red filter and blue filter.

In the LCD of this invention, the transmissivity of the LCD is improved in inverse proportion to the color filter's thickness (a>b>c) as shown in the graph of FIG. 4. The chromaticity purity of the LCD is improved in proportion to the color filter's thickness as shown in the graph of FIG. 5. The brightness of the LCD is improved in inverse proportion to the color filter's thickness as shown in FIG. 6. Therefore, the transmissivity, chromaticity purity and brightness of the green filter 3G, which are intrinsically lower than those of the other filters 3R and 3B, can be easily controlled by changing the thickness of the green filter 3G relative to the other filters 3R and 3B.

As described above, the present invention provides an improved LCD. In the above LCD, one or two color filters, except for the green filter, are formed on one glass substrate with the black matrix, while one or two color filters, including the green filter, are formed on another glass substrate. It is thus possible to control both the width of the black matrix and the size of the color filters. One color filter, intrinsically having lower chromaticity purity and transmissivity than the other color filters, is formed separately from the other color filters. The above LCD thus easily compensates for the characteristics of the one color filter having the lower chromaticity purity and transmissivity. As the one color filter is formed separately from the other color filters, the color filters of this LCD can be thus formed on the glass substrates in disregard of the conventional processing order of the green filter, red filter and blue filter, thereby easily producing the LCD.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A liquid crystal display comprising a black matrix and a plurality of color (red, green and blue) filters formed on a pair of opposite glass substrates, wherein filters of one or two colors other than green, are formed on one glass substrate with said black matrix, while filters of two or one color, respectively, including said green filter, are formed on the other glass substrate such that the edge of the color filters of the one glass substrate are aligned with the edge of the color filters of the other glass substrate.

2. The liquid crystal display according to claim 1, wherein said red and blue filters are formed on the one glass substrate with said black matrix, while said green filters are formed on the other glass substrate.

* * * * *